(12) United States Patent
Shrikhande et al.

(10) Patent No.: US 9,522,363 B2
(45) Date of Patent: Dec. 20, 2016

(54) MATERIAL EFFICIENCY AND FABRICATION OF MEMBRANE ELEMENTS

(75) Inventors: Prashant Vishwanath Shrikhande, Eden Prairie, MN (US); Steven John Harrold, Chanhassen, MN (US); Cha Moua, Brooklyn Center, MN (US); Phillip Goebel, New Hope, MN (US); Yatin Tayalia, Whitefield Bangalore (IN); Prasanna Rao Dontula, Channasandra Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1205 days.

(21) Appl. No.: 13/473,252

(22) Filed: May 16, 2012

(65) Prior Publication Data

US 2013/0098831 A1    Apr. 25, 2013

Related U.S. Application Data

(63) Continuation-in-part of application No. 13/276,802, filed on Oct. 19, 2011.

(51) Int. Cl.
*B29C 63/10* (2006.01)
*B65H 81/00* (2006.01)
(Continued)

(52) U.S. Cl.
CPC ............. *B01D 63/10* (2013.01); *B01D 63/103* (2013.01); *B01D 65/003* (2013.01);
(Continued)

(58) Field of Classification Search
CPC ....... B01D 63/10; B01D 3/103; B01D 65/003; B01D 2313/04; B29C 53/562; B29C 65/00; B29C 65/48; B29C 66/00; B29C 66/05; B29C 66/20; B32B 37/00; B32B 37/12; B32B 37/1284; B32B 37/1292
(Continued)

(56) References Cited

U.S. PATENT DOCUMENTS 3,173,867 A    3/1965    Michaels
3,332,216 A    7/1967    Stern
(Continued)

FOREIGN PATENT DOCUMENTS

EP    0129663 B1    5/1988
EP    0443642       8/1991
(Continued)

OTHER PUBLICATIONS

Search Report and Written Opinion from corresponding PCT Application No. PCT/US2012/058551 dated Jul. 4, 2013.
(Continued)

*Primary Examiner* — Philip Tucker
*Assistant Examiner* — Brian R Slawski

(57) ABSTRACT

Membrane elements that use multiple membrane leaves may have a limited total active membrane area due to an increased diameter at the ends of the element. Membrane leaves may comprise a permeate carrier positioned between one or more membrane sheets. Adhesive may be used to seal one or more edges of the membrane leaf. The membrane sheets, permeate carrier and the adhesive contribute to the thickness of the edges of the membrane leaf and the diameter at the ends of the element. A reduced thickness of the edges of the permeate carrier may reduce the diameter at the ends of an element. Another permeate carrier sheet may also be used that is distanced from at least one edge of the membrane sheet so the permeate carrier sheet does not contribute towards the increased diameter at the ends of the element.

7 Claims, 5 Drawing Sheets

(51) Int. Cl.

| | | |
|---|---|---|
| B29C 65/00 | (2006.01) | |
| B32B 7/14 | (2006.01) | |
| B29C 65/48 | (2006.01) | |
| B32B 37/00 | (2006.01) | |
| B01D 24/00 | (2006.01) | |
| B01D 25/00 | (2006.01) | |
| B01D 27/00 | (2006.01) | |
| B01D 29/00 | (2006.01) | |
| B01D 33/00 | (2006.01) | |
| B01D 35/00 | (2006.01) | |
| B01D 29/46 | (2006.01) | |
| B01D 63/10 | (2006.01) | |
| B29C 53/56 | (2006.01) | |
| B01D 65/00 | (2006.01) | |
| B32B 37/12 | (2006.01) | |

(52) U.S. Cl.
CPC .... *B01D 2313/04* (2013.01); *B01D 2313/146* (2013.01); *B29C 53/562* (2013.01); *B29C 65/48* (2013.01); *B29C 66/20* (2013.01); *B32B 37/1292* (2013.01)

(58) Field of Classification Search
USPC ......... 156/60, 184, 185, 187, 188, 190, 191, 156/192, 290, 291, 295; 210/348, 459, 210/460, 483, 488, 492; 497.01, 497.1, 210/541

See application file for complete search history.

(56) References Cited

U.S. PATENT DOCUMENTS

| | | | |
|---|---|---|---|
| 3,494,468 A | 2/1970 | Khol | |
| 3,508,994 A | 4/1970 | Nyrop | |
| 3,984,319 A | 10/1976 | Hubbard et al. | |
| 3,985,655 A | 10/1976 | Miller, III | |
| 4,235,723 A | 11/1980 | Bartlett, Jr. | |
| 4,264,447 A | 4/1981 | Nicolet | |
| 4,476,022 A * | 10/1984 | Doll ................. | B01D 63/103 |
| | | | 210/321.83 |
| 4,735,717 A | 4/1988 | Sims | |
| 4,802,982 A | 2/1989 | Lien | |
| 4,855,058 A | 8/1989 | Holland et al. | |
| 4,902,417 A | 2/1990 | Lien | |
| 5,069,793 A | 12/1991 | Kaschemekat et al. | |
| 5,096,584 A | 3/1992 | Reddy et al. | |
| 5,096,591 A | 3/1992 | Benn | |
| 5,104,532 A | 4/1992 | Thompson et al. | |
| 5,108,604 A | 4/1992 | Robbins | |
| 5,147,541 A | 9/1992 | McDermott, Jr. et al. | |
| 5,154,832 A | 10/1992 | Yamamura et al. | |
| 5,275,726 A | 1/1994 | Feimer et al. | |
| 5,458,774 A | 10/1995 | Mannapperuma | |
| 5,538,642 A | 7/1996 | Solie | |
| 5,626,752 A | 5/1997 | Mohn et al. | |
| 5,681,467 A | 10/1997 | Solie et al. | |
| 5,858,229 A | 1/1999 | Uemura et al. | |
| 6,068,771 A | 5/2000 | McDermott et al. | |
| 6,106,715 A | 8/2000 | Thalmann et al. | |
| 6,224,767 B1 | 5/2001 | Fujiwara et al. | |
| 6,299,772 B1 | 10/2001 | Huschke et al. | |
| 6,413,424 B1 * | 7/2002 | Shelby ................. | B01D 61/10 |
| | | | 210/321.74 |
| 6,432,310 B1 | 8/2002 | Andou et al. | |
| 6,524,478 B1 | 2/2003 | Heine et al. | |
| 6,632,357 B1 | 10/2003 | Barger et al. | |
| 6,656,362 B1 | 12/2003 | Kihara et al. | |
| 6,673,242 B1 | 1/2004 | Herron | |
| 7,264,724 B2 | 9/2007 | Vigna et al. | |
| 7,828,970 B2 | 11/2010 | Kloos et al. | |
| 7,892,430 B2 | 2/2011 | Voigt et al. | |
| 2004/0045892 A1 | 3/2004 | De La Cruz | |
| 2004/0099598 A1 | 5/2004 | Cheng | |
| 2004/0124133 A1 | 7/2004 | Irie et al. | |
| 2004/0188342 A1 | 9/2004 | Bellhouse et al. | |
| 2004/0195164 A1 | 10/2004 | Hirokawa et al. | |
| 2005/0173333 A1 | 8/2005 | Kloos et al. | |
| 2006/0043013 A1 * | 3/2006 | Hiro .................... | B01D 65/003 |
| | | | 210/321.85 |
| 2006/0141216 A1 | 6/2006 | Hartman et al. | |
| 2007/0056894 A1 | 3/2007 | Connors | |
| 2007/0068864 A1 | 3/2007 | Cruz et al. | |
| 2008/0251442 A1 | 10/2008 | Shen et al. | |
| 2010/0051546 A1 | 3/2010 | Vuong et al. | |
| 2010/0096316 A1 | 4/2010 | Chikura et al. | |
| 2011/0192794 A1 | 8/2011 | Chidambaran et al. | |

FOREIGN PATENT DOCUMENTS

| | | | | |
|---|---|---|---|---|
| EP | 0508646 | A1 | 10/1992 | |
| EP | 0943367 | A1 | 9/1999 | |
| EP | 0027511 | A1 | 5/2000 | |
| EP | 1462154 | A1 | 9/2004 | |
| EP | 1355730 | B1 | 2/2011 | |
| JP | 54-080542 | U1 | 6/1979 | |
| JP | 06319965 | A | 11/1994 | |
| JP | 2001-300271 | A | 10/2001 | |
| JP | 2006-218345 | A | 8/2006 | |
| JP | 2006218345 | A * | 8/2006 | ............ B01D 63/10 |
| JP | 2009-509749 | A | 3/2009 | |
| WO | 0078436 | A1 | 12/2000 | |
| WO | 0220142 | A1 | 3/2002 | |
| WO | 02051528 | A1 | 7/2002 | |
| WO | 03101575 | A2 | 12/2003 | |
| WO | 2005070524 | A1 | 8/2005 | |
| WO | 2005092483 | A1 | 10/2005 | |
| WO | 2005097304 | A1 | 10/2005 | |
| WO | 2005097305 | A1 | 10/2005 | |
| WO | 2006015461 | A1 | 2/2006 | |

OTHER PUBLICATIONS

Unofficial English Translation of Japanese Office Action issued in connection with corresponding JP Application No. 2014537093 on Jan. 15, 2016.

US Non-Final Office Action issued in connection with related U.S. Appl. No. 13/276,802 on Oct. 23, 2014.

US Final Office Action issued in connection with related U.S. Appl. No. 13/276,802 on Jun. 5, 2015.

Japanese Office Action issued in connection with corresponding JP Application No. 2014537093 on May 31, 2016.

\* cited by examiner

MATERIAL EFFICIENCY AND FABRICATION OF MEMBRANE ELEMENTS

RELATED APPLICATIONS

This is a continuation-in-part of non-provisional patent application U.S. Ser. No. 13/276,802, filed on Oct. 19, 2011, which is incorporated herein by reference.

FIELD

This specification relates to membrane elements and modules and to permeate carriers for membrane elements and modules.

BACKGROUND

The following discussion is not an admission that anything described below is common general knowledge or citable as prior art.

A spiral wound membrane element is made by wrapping one or more membrane leaves and feed spacer sheets around a perforated central tube. The membrane leaves have a permeate carrier sheet placed between two generally rectangular membrane sheets. The membrane sheets are sealed together along three edges. The fourth edge of the leaf is open and abuts the central tube. One or more layers of permeate carrier sheet may also be wrapped around the central tube to support the membrane leaf over the perforations in the central tube and to provide a flow path between the edge of the leaf and the central tube. Product water, also called permeate, passes through the membrane sheets and then flows through the permeate carrier sheet to reach the central tube. US Patent Application Publication Number 2007/0068864 describes one example of a spiral wound membrane element.

The permeate carrier sheet may be a tricot fabric knitted with yarn, or filaments, made from one or more of polyester, polypropylene, nylon or other suitable synthetic materials. The relative movement of the filaments may be reduced and the tricot fabric may be strengthened with an epoxy coating, a Melamine coating or a heat treatment. The tricot fabric is porous and forms a series of parallel ridges, which keep the membrane leaf from collapsing, separated by grooves on one side of the fabric. The grooves are oriented perpendicular to the central tube to provide less obstructed passages for permeate to flow inwards through the membrane leaves to the central tube. A separate reinforcing or anti-bagging layer, made for example of felt or another non-woven or otherwise porous sheet material, may be placed between the membrane sheet and the tricot fabric to help keep the membrane sheet from being pressed into the grooves of the tricot.

U.S. Pat. No. 6,656,362 discloses various dimensions and materials for a permeate carrier sheet and reinforcing sheets that may be used with a high pressure spiral wound membrane. International Publication Number WO 03/101575 discloses permeate carrier materials intended to have low resistance to flow. U.S. Pat. Nos. 4,802,982 and 7,048,855 describe permeate carrier materials that are directly bonded to a membrane sheet. US Patent Application Publication No. 2004/0195164 A1 describes a spiral wound membrane element in which a) the total area of perforations in the central tube multiplied by the percentage of openings of one layer of a permeate carrier wrapped around the central tube is at least as much as b) the inner cross-sectional area of the central tube.

INTRODUCTION TO THE INVENTION

A permeate carrier to be described in detail below has one or more borders, at the side edges of the permeate carrier, that are thinner than a central part of the permeate carrier. The permeate carrier may be used in a membrane leaf in a spiral wound membrane element or module. In the membrane leaf, the permeate carrier is located between upper and lower membrane sheets. An adhesive is applied in lines to the one or more borders, and any other edges of the leaf needing to be sealed. Compression applied to the membrane leaf before or while winding the leaf around a central tube, or both, causes the adhesive to penetrate through the permeate carrier to join the two membrane sheets together.

The compression applied to the membrane leaf also causes the lines of adhesive to spread or widen, possibly in an uneven manner. Any increase in the width of the adhesive lines causes a corresponding reduction in the active membrane area, meaning the membrane area that product water can permeate through. Further, the permeate carrier comprises a series of permeate channels and a local bulge in the spreading adhesive might block one or more of these channels. A transition between the relatively thin border and the central part of the permeate carrier resists adhesive spreading into the central part of the permeate carrier beyond the transition. The transition is located to provide an adequate width of adhesive after the ends of the element are trimmed to their final length. The transition encourages adhesive to spread parallel to the transition to any part of the border that is lacking adhesive, or to the outsides of the membrane leaf which will be removed when the element is trimmed to its final length. This tends to reduce losses in the active area of the membrane leaf and blocked permeate channels beyond what is required to provide an adequate amount of adhesive.

After the membrane leaf is wound around the central tube, the side edges with their attached lines of adhesive extend in a spiral around the central tube. In the absence of relatively thin borders, the ends of a membrane element would have a larger diameter than the central part. The outer diameter of the ends of the element limits the number or length of membrane leaves that may be placed in a pressure vessel of a given inside diameter. Providing relatively thin borders in the permeate carrier at least reduces any increase in diameter at the ends of an element that might otherwise be caused by the adhesive. Accordingly, more or longer membrane leaves may be placed in a pressure vessel of a given inside diameter, thus increasing the active membrane area of the element.

A second permeate carrier to be described in detail below has one or more borders that are not thinned but are narrower than the dimensions of an associated membrane sheet within a membrane leaf. This may result in the side edges of the second permeate carrier being distanced from the side edges of the membrane sheets.

Adhesive may be applied to edges of the membrane sheet to seal one or more edges of the membrane leaf, including the second permeate carrier. Compression may be applied to the membrane leaf before or during winding the spiral wound membrane element around a central tube, or both. The compression may cause the adhesive to advance, or spread, towards the edge of the second permeate carrier and penetrate into the second permeate carrier. This penetration of the adhesive may seal, or adhere, the second permeate carrier to at least a portion of the membrane sheets and allow the edges of the membrane sheets to seal together to form the membrane leaf with the second permeate carrier positioned inside.

A typical spiral wound membrane element uses a permeate carrier sheet that is substantially the same width as the membrane sheets. The lines of adhesive are applied on top of and/or underneath of the permeate carrier sheet. In the construction of a typical membrane leaf, the adhesive may have a tendency to remain at the interface between the permeate carrier sheet and the membrane sheet, which may increase the thickness of the membrane leaf along the side edges, as described above. When the membrane leaves and feed channel spacers are wound around the central tube, the side edges of the membrane leaves, including the adhesive, extend as multiple, concentric layers in a spiral around the central tube. The thickness of the permeate carrier sheet, the membrane sheet and the adhesive may cause the spiral wound membrane element to be thicker at both ends, relative to the middle portions of the spiral wound membrane element which do not have multiple layers of adhesive.

The thickness at the ends of the spiral wound membrane element may limit the number of membrane leaves that fit inside a pressure vessel of a given internal diameter. Providing a permeate carrier sheet that contributes to decreasing the thickness of the side edges of the membrane leaf reduces the thickness at the ends of a membrane element. Preferably, the second permeate carrier sheet permits the covering, spreading, or penetration of the adhesive into the second permeate carrier sheet during construction of the membrane leaf, which may reduce any contribution of the adhesive to the thickness at the side edges of the membrane leaf. A reduced thickness at the ends of an element may permit more or longer membrane leaves to fit within a pressure vessel of a given internal diameter, which increases the active membrane area.

The basic requirements of a spiral wound membrane element are high permeate throughput or flow, high solute rejection, low fouling tendency and efficient use of energy. The permeate carriers described herein aim to improve the permeate flow without materially affecting the solute rejection or increasing membrane fouling. Permeate flow is increased by increasing the active membrane area within a pressure vessel of a given internal diameter, without increasing the energy input.

In some filtration applications the feed water may contain particulate or solid matter that plugs in the holes, also referred to as channels, of the feed spacer. This plugging of the feed channels may result in a loss of pressure across the membrane, which decreases the rate of permeate production. Optionally, if permeate carrier sheets decrease the diameter at the ends of the spiral wound membrane element, thicker feed spacers may be used. Thicker feed spacer channels may have larger channels that may reduce or delay plugging.

The permeate carriers described herein may be used in various configurations of membrane elements and modules. Particularly, membrane elements and modules that are limited, either in permeate flow or otherwise, by one or more membrane leaves with thicker edges that are a result of the sealing of the membrane leaf during construction. Optionally, the permeate carriers described herein may be used in a membrane leaf of a spiral wound membrane element or module or other types of sheet based membrane elements and modules.

DETAILED DESCRIPTION

Figure 1:
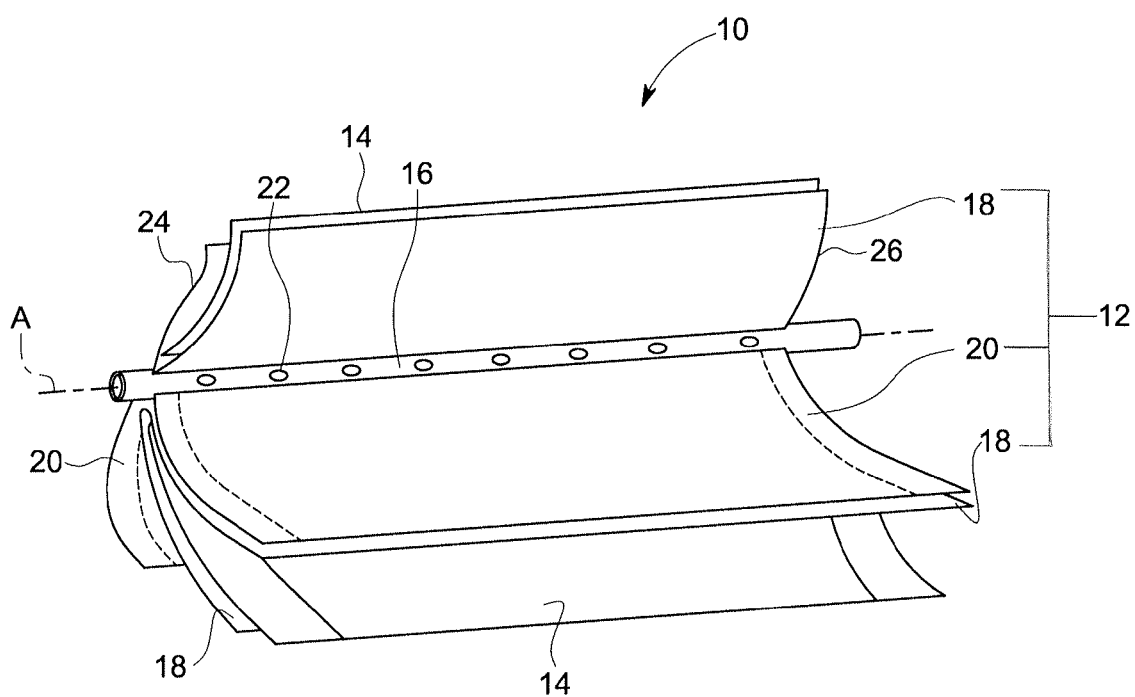
FIG. 1 is a cut-away perspective view of a spiral wound membrane element.
Figure 2:
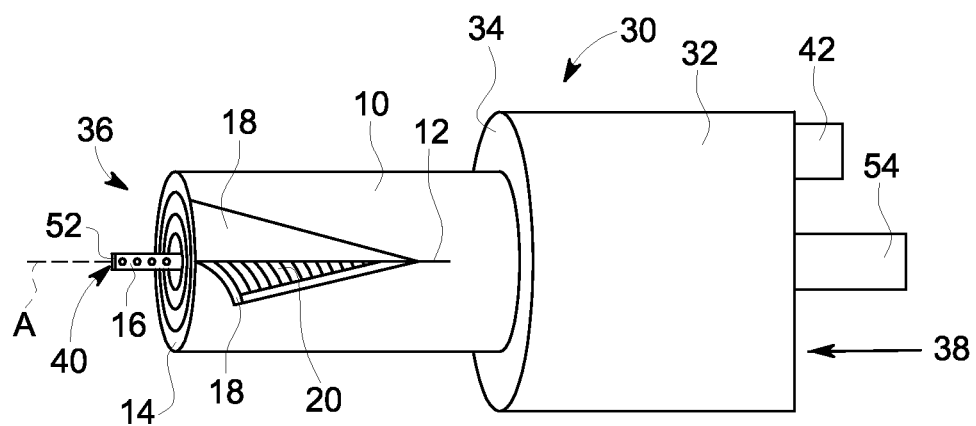
FIG. 2 is a cut-away perspective view of a spiral wound membrane module including the element of FIG. 1.

Referring to FIGS. 1 and 2, a spiral wound membrane element 10 is formed by wrapping one or more membrane leaves 12 and feed spacer sheets 14 around a perforated central tube 16. The membrane leaves 12 may also be called envelopes. The feed spacer sheets 14 may also be called brine channel spacers. The central tube 16 may also be called a core, a permeate tube or a product water collection tube. The leaves 12 comprise two generally rectangular membrane sheets 18 surrounding a permeate carrier 20. The edge of the membrane leaf 12 abutting the central tube 16 is open, but the other three edges of a leaf 12 are sealed, for example by an adhesive. Less frequently, the two membrane sheets 18 of a membrane leaf 12 may be attached through a fold line at the tip of the leaf, in which case only the two side edges of a membrane leaf 12 are sealed with adhesive. The permeate carrier 20 is shown schematically in FIGS. 1 and 2 but will be shown in more detail in FIGS. 3 and 4.

The membrane sheets 18 may have a separation layer cast onto a supporting or backing layer. The separation layer may be, for example, cellulose acetate, a polyamide, a thin film composite or other materials that may be formed into a separation membrane. The separation layer may have pores, for example, in the reverse osmosis, nanofiltration or ultrafiltration range. Filtered product water, also called permeate, passes through the membrane sheet while the passage of dissolved salts or suspended solids or other contaminants are rejected by the membrane sheet 18 depending on its pore size.

The permeate carrier 20 is in fluid contact with rows of small holes 22 in the central tube 16 through the open abutting edge of the membrane leaf 12. An additional permeate carrier sheet (not shown), which might or might not be the same material as the permeate carrier 20 in the membrane leaves 12, or an extension of the permeate carrier 20 of a first membrane leaf 12, may be wrapped around the central tube 16 in one or more layers before the first membrane leaf 12 is attached to the central tube 16. This initial wrap of permeate carrier 20 supports the membrane leaves 12 over the holes 22 and provides a path to conduct permeate water from the membrane leaves 12 to the holes 22 in the central tube 16. The holes 22 typically have a diameter of about 0.125 inches (3.2 mm) and conduct product water to the inside of the central tube 16.

Each leaf 12 is separated by a feed spacer sheet 14 that is also wound around the central tube 16. The feed spacer 14 is in fluid contact with both ends of the element 10 and it acts as a conduit for feed solution across the surface of the membrane sheets 18. The direction of feed flow is from the entrance end 24 to the concentrate end 26 parallel to the axis A of the central tube 16.

Referring to FIG. 2, a spiral wound membrane module 30 has an element 10 located inside of a pressure vessel 32. The pressure vessel 32 has a generally tubular body 34, an inlet end 36 and an outlet end 38. Feed water enters through an inlet (not shown) of the pressure vessel 32. The feed water travels through the feed spacer 14 of the element 10. A portion of the feed water that does not pass through the membrane sheets 18, which may be called brine, retentate or reject water, leaves the pressure vessel 32 through a discharge tube 42. Product water, or permeate, collects in the inside of the central tube 16 and then typically travels in a direction from a first end 52 to a second end 54 of the central tube 16. The second end 54 of the last, or an only, element 10 may be sealed, may exit the pressure vessel 32 or may be connected to a fitting that exits the pressure vessel. The first end 52 of a first or only element 10 may be sealed, may exit the pressure vessel 32 or may be connected to a fitting that exits the pressure vessel 32. If there are multiple elements 10 in a pressure vessel 32, the second end 54 of an upstream element 10 is typically connected to the first end 52 of a downstream element. Feed water flows in series through the feed spacers 14 of multiple elements 10 in a pressure vessel. Peripheral seals may be provided between an outer wrap (not shown) of the element 10 and the inside of a pressure vessel 32 to prevent feed water from flowing past an element 10 without passing through its feed spacers 14.

Figure 3:
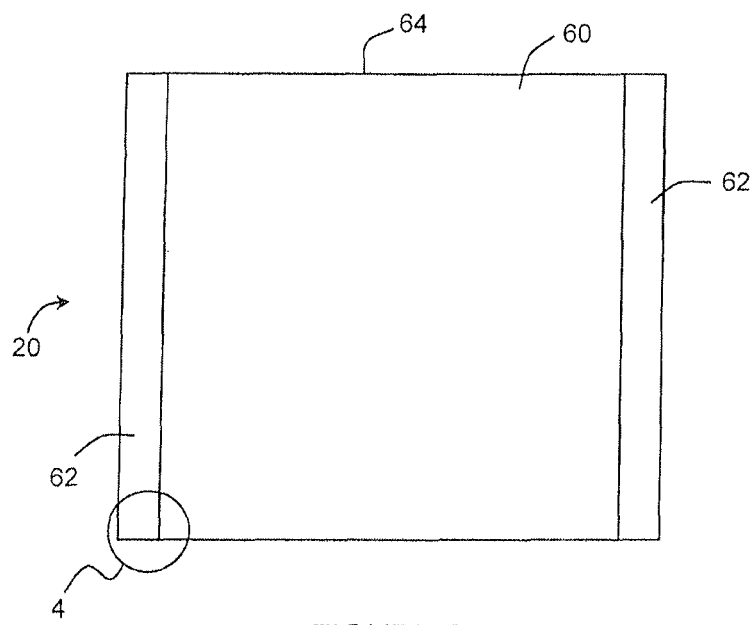
FIG. 3 is a top view of a permeate carrier.
Figure 4:
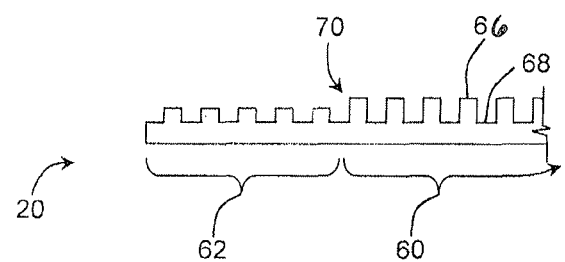
FIG. 4 is a side view of a portion of the permeate carrier of FIG. 3.

FIGS. 3 and 4 show the permeate carrier 20 in more detail. The permeate carrier 20 has a central portion 60 and one, or preferably two, borders 62. The borders 62 are generally perpendicular to a front edge 64 of the permeate carrier 20 that will be open to the central tube 16. The permeate carrier 20 may be a woven sheet made, for example, of polymeric filaments. The filaments in the permeate carrier 20 may be made of organic polymers such as nylon, polypropylene or polyester. The filaments may be coated with epoxy or melamine, or the woven permeate carrier 20 may be impregnated with epoxy or melamine, to help stabilize the permeate carrier 20.

The central portion 60, and optionally the borders 62, may be woven into a tricot fabric. In a tricot fabric, the yarn zigzags vertically along columns of the knit resulting in a series of parallel raised wales 66 separating permeate channels 68 on a front side, alternately called the wale side, of the fabric. On the back side of the fabric, which may be called the course side, ribs are formed perpendicular to the raised wales 66, but the ribs are not as sharply defined as the raised wales 66 and are not as tall as the raised wales 66. A transition 70 separates the central portion 60 from a border 62.

The borders 62 may be produced by applying pressure to the side edges of an initially homogenous permeate carrier 20. For example, the side edges may be calendared. Alternatively, the permeate carrier 20 may be manufactured with thinner borders 62. For example, thinner yarn may be used at the edges of a sheet (in the machine direction) during a warp knitting process similar to that used to produce conventional permeate spacers. For further example, a sheet may me be knit without wales at the edges of a sheet. These two basic techniques may also be combined. For example, a fabric may be knit with more deformable yarns or fewer wales per inch at the edges, followed by applying pressure to the edges.

The inventors have observed that a membrane leaf made with a homogenous permeate carrier tends to have side edges (the edges perpendicular to the central tube) that are 2 to 5 mil (approximately $5.08 \times 10^{-3}$ cm to $1.27 \times 10^{-2}$ cm, for reference 1 mils is equivalent to $1/1000^{th}$ of an inch and $2.54 \times 10^{-3}$ cm), or 10 to 22%, thicker than the remainder of the membrane leaf. The increase in thickness is caused by the adhesive, alternatively called glue lines, used to seal the edges of a membrane leaf. Various types of adhesive may be used, including but not limited to cross-linking adhesive, thermal adhesive, ultraviolet curable adhesive, hot-melt adhesive, and the like. Since the outer diameter of an element is typically maintained within a narrow range relative to the inside diameter of a pressure vessel, the limiting diameter of the element is typically formed by the side edges of the membrane leaves.

With a permeate carrier 20 as described above, the reduced thickness of the borders 62 reduces the thickness of the side edges of the membrane leaf 12. For example, the thickness of the permeate carrier 20 at the borders 62 can be 2 to 5 mil thinner than the central part 60 of the permeate carrier 20. The increases thickness of the side edges of a membrane leaf 12 is at least reduced, and optionally the side edges of the membrane leaf 12 may be thinner than or equal to a central portion of the membrane leaf 12. Each membrane leaf 12 may then be made longer, or an additional membrane leaf 12 may be added, to increase the total membrane area of the element 10.

The inventors have also observed that the glue lines materially reduce the active area of a membrane leaf. In a typical manufacturing process, one membrane sheet is laid out horizontally on a table and a homogenous permeate carrier is placed on it. Glue lines are laid down on the two side edges and the leaf tip edge of the homogenous permeate carrier. Another membrane sheet is laid over the homogenous permeate carrier and the glue lines to complete the leaf. The edges of the leaf might be compressed while still resting on the table. The leaf is also compressed due to tension applied while the leaf is wound around the central tube. The glue spreads from its initial location as the leaf is compressed. Glue spreading inwards reduces the active membrane area. The width of the glue lines may vary between, for example, 1 inch (approximately 2.54 cm) with automatic glue application and 1.75 inches (approximately 4.44 cm) with manual glue application. Further local increases in the width of a glue line may be caused by a glue line that veered inwards when it was laid down, by a local increase in the thickness of the glue line when it was applied, or by a locate increase in compression.

A similar manufacturing technique may be used with the element 10, but when a permeate carrier 20 with thinner borders 62 is used, the adhesive is also encouraged to spread outwards, rather than inwards past the transition 70. The transition 70 is located to provide an adequate, but not excessive, width of adhesive at the side edges of a membrane leaf 12. The borders 62 thus inhibit excessive loss in membrane active area. Compared to a typical manually rolled element, the active membrane area could be increased by about 4% by restricting spread of the adhesive beyond the 1 inch side glue lines experienced with automated gluing. However, the inventors believe that the transition 70 may allow thinner glue lines to be sufficient, which would create a corresponding increase in active membrane area per element. A further benefit would be reduced local blockage of otherwise open permeate channels, which would allow membrane area past the blockage be more productive. In some cases, less glue might be used per element.

Figure 5:
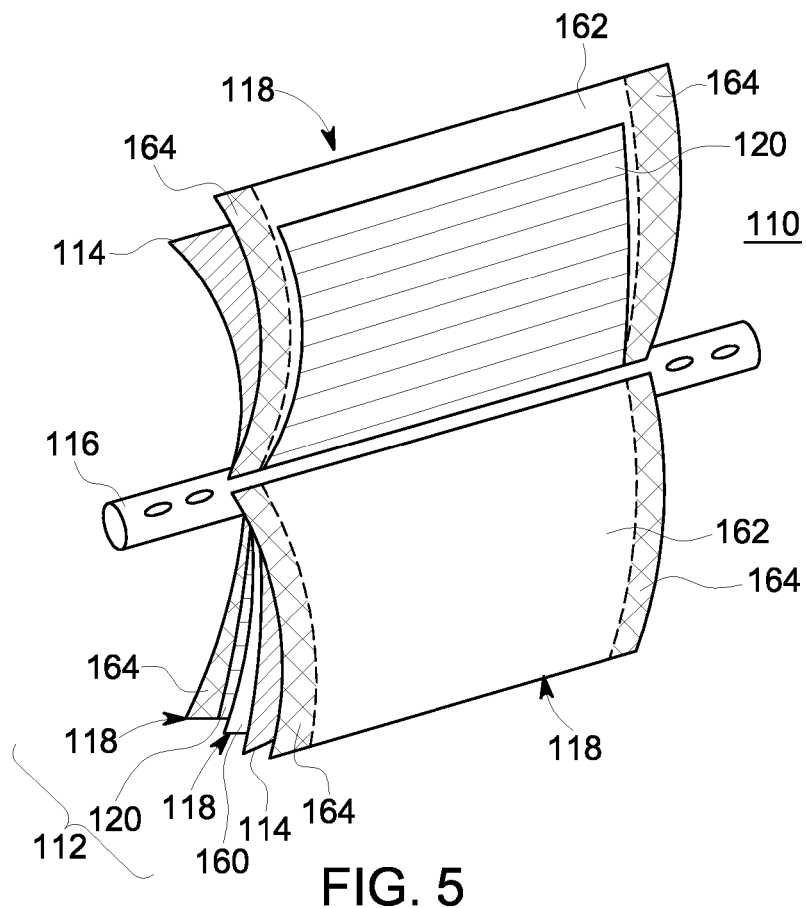
FIG. 5 is a cut-away perspective view of an unwound spiral wound membrane element with a second example permeate carrier.

FIG. 5 depicts a second example spiral wound membrane element 110 in an unwound state. The spiral wound membrane element 110 may be the same as element 10 except for the permeate carrier used. For example, the spiral wound membrane element 110 comprises one or more membrane leaves 112 and one or more feed spacer sheets 114 that may be wrapped around a perforated central tube 116 and housed within a pressure vessel 32. The membrane leaves 112 may also be called membrane envelopes. Each membrane leaf 112 includes a second example of a permeate carrier 120 positioned between two generally rectangular membrane sheets 118. The membrane leaf 112 may be sealed at three edges with the edge that is closest to the central tube 116 left open. The feed spacer sheets 114 may be positioned adjacent the membrane leaf 112. If there is more than one membrane leaf 112 within a spiral wound membrane element 110, feed spacer sheets 114 may be positioned between adjacent membrane leaves 112. For example, there may be at least one feed spacer sheet 114 for each membrane leaf 112.

The second permeate carrier 120 may be constructed of the same materials as the permeate carrier 20 described above.

The edges of the membrane leaf 112 that are perpendicular to the open edge are referred to as the side edges of the second permeate carrier sheets 120, the membrane sheets 118 and the membrane leaves 112, respectively. The side edges of the second permeate carrier sheets 120 are the same edges as where the one or more borders are located on the permeate carrier 20 described above, however, there is no thinning of the side edges of the permeate carrier 120. The side edges of permeate carrier 120 are associated with the side edges of the membrane sheets 118 and. For example, one side edge of the second permeate carrier 120 is associated with the side edge of membrane sheet 118 on the same side of the membrane leaf 112. The distances between the side edges are referred to as the widths of the second permeate carrier sheets 120, the membrane sheets 118 and the membrane leaves 112, respectively.

The edges of the two adjacent membrane sheets 118 of the membrane leaf 112 that are opposite to the open edge are sealed together and associated with the edge of the second permeate carrier 120 that is also opposite the open edge. The length of the second permeate carrier 120 and the two adjacent membrane sheets 118 may be the same, or similar, so these edges are aligned in an edgewise fashion, or not. These edges may be referred to as the distal edge of the membrane sheet 118, the second permeate carrier 120 and the membrane leaf 112, respectively.

In FIG. 5, the second permeate carrier 120 is depicted narrower than the adjacent membrane sheets 118. The side edges of the second permeate carrier 120 are distanced from the associated side edges of the adjacent membrane sheets 118. The distance between the side edges of the second permeate carrier 120 and the associated side edges of the membrane sheets 118 defines a border region 164 on either side of the membrane leaf 112. The border region 164 is where the lines of adhesive may be placed on the membrane sheets 118 to complete the side edges of the membrane leaf 112.

The second permeate carrier 120 may be of various widths. For example, the membrane sheet 118 may have a width of 40 inches (approximately 101.6 cm) and the second permeate carrier 120 may have a width of 30 inches (approximately 76.2 cm), which defines the border region 164 as being 5 inches (approximately 12.7 cm) on either side of the second permeate carrier 120. Optionally, the second permeate carrier 120 may have a width that is substantially between 32 inches and 38 inches (approximately 81.3 cm and 96.5 cm, respectively), and all subranges therebetween. Preferably, the second permeate carrier 120 has a width that is substantially between 34 inches and 37 inches (approximately 86.4 cm and 94 cm, respectively).

Figure 6:
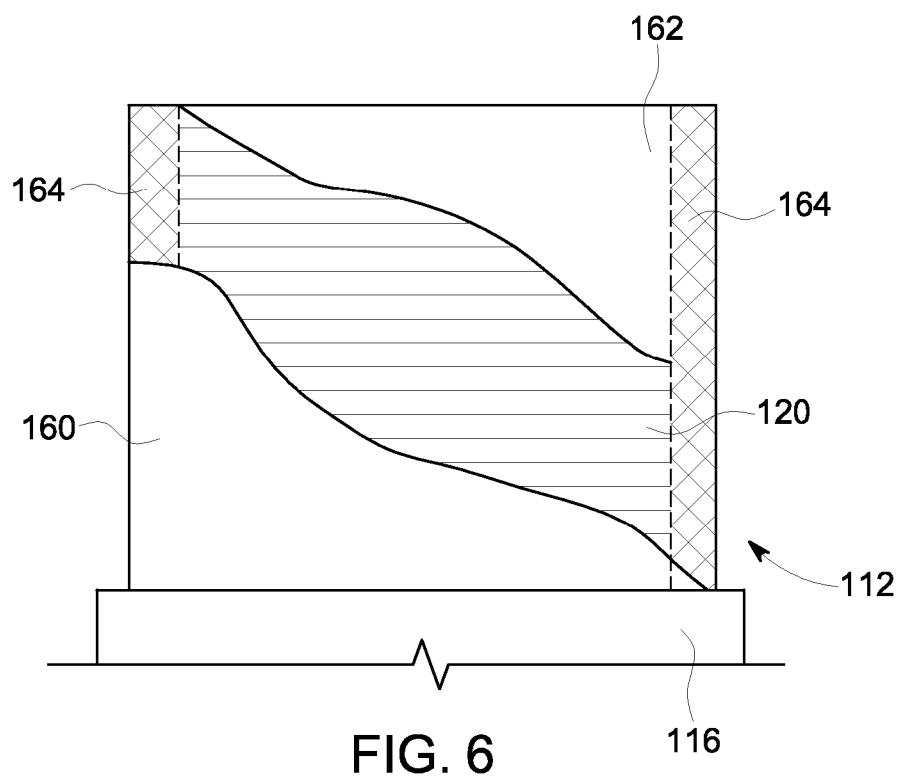
FIG. 6 is a cut away, top plan view of a membrane leaf that includes the second permeate carrier.

FIG. 6 shows a partial cut-away view of the membrane leaf 112 positioned adjacent the central tube 116. The top layer shown is a separation layer 160 of the membrane sheet 118 and the bottom layer is a backing side 162 of an adjacent membrane sheet 118. Positioned between these two membrane sheets 118 is the second permeate carrier 120. The side edges of the second permeate carrier 120 are perpendicular to the central tube 116 and are distanced from the side edges of the membrane sheets 118 to define the border region 164 on both sides of the membrane sheet 118. Border regions 164 may be, but not necessarily, equal on both sides.

To seal the edges of the membrane leaf 112, adhesive may be applied at or near the distal edges of aligned membrane sheets 118 and the second permeate carrier 120. The membrane leaf 112 is not a pre-sealed or pre-formed pocket. Adhesive may also be applied within the border region 164 of the backing side 162, typically around 1 inch (approximately 2.54 cm) from the side edges of the membrane sheet 118. The adhesive may spread during the compression or rolling of the spiral wound membrane element 110 through the border region 164.

Optionally, a machine may apply a line of adhesive that is wider, with respect to the width of the membrane sheet 118, and thinner, with respect to the thickness of the adhesive. This machine-applied glue line might not need to spread appreciably, or at least not as much. Optionally, the machine-applied glue line may abut against or overlap with a side edge of the second permeate carrier 120. Optionally, the machine applied glue line may abut against or overlap with the distal edge of the permeate carrier.

While spreading, or advancing, through the border region 164, and prior to curing, the adhesive may contact the side edges of the second permeate carrier 120. The spreading and contact with the side edges may cause the adhesive to penetrate into the woven structure of the second permeate carrier 120. The adhesive may penetrate at least about 0.1 inch (approximately 0.254 cm) past the side edge of, and into, the second permeate carrier 120. Optionally, the adhesive may penetrate between 0.25 inches (approximately 0.635 cm) and 3.5 inches (approximately 8.89 cm), and all subranges therebetween, past the side edges of the second permeate carrier 120 and into the permeate carrier sheet second 120. Preferably, the adhesive penetrates between 0.5 inch (approximately 1.27 cm) and 2 inches (approximately 5.08 cm) past the side edges of the second permeate carrier 120 and into the woven structure of the second permeate carrier 120. The spreading and penetration of the adhesive into the second permeate carrier 120, at the side edges, may prevent the formation of side channels and reduce the amount of adhesive that remains at the interface between the second permeate carrier 120 and the membrane sheet 118.

It is understood that the distance that the adhesive spreads, or advances, may depend upon various factors including but not limited to: the amount of adhesive applied, the type of adhesive that is applied, the manner by which the adhesive is applied, the mechanical forces applied to the adhesive or the components of the membrane leaf 112, and temperature. The ranges of distance that the adhesive may advance past the edge of the second permeate carrier 120 provided above are examples only.

When the adhesive cures, the second permeate carrier 120 may be sealed, or adhered, to the membrane sheet 118 and the membrane sheet 118 may be sealed to an adjacent membrane sheet 118 to form the sealed edges of the membrane leaf 112.

Optionally, a portion of the second permeate carrier 120 may have the same, or greater, width as the membrane leaf 112. This portion of the permeate carrier can be used as an initial wrap or base wrap around the central tube 116 to support the membrane leaves 112.

In another option of the membrane leaf 112, the distal edge of the second permeate carrier 120 can also be distanced from the associated distal edge of the membrane sheets 118. This option may reduce the overall thickness of the membrane leaf at the three sealed edges by the spreading and penetration of the adhesive into the second permeate carrier 120 at the distal edge. This may permit more membrane leaves 112, or optionally longer membrane leaves 122, to be included and thereby increase the overall active surface area of the spiral wound membrane element 110.

In another option, a thicker feed spacer (not shown), may be used in an element 10, 110. For example, if a typical feed spacer sheet 114 is approximately 31 mils thick (approximately $7.87 \times 10^{-2}$ cm) a thicker feed spacer with a thickness between approximately 32 mils and 35 mils (approximately $8.13 \times 10^{-2}$ cm to $8.89 \times 10^{-2}$ cm) or more, and all subranges therebetween, may be used. In this option, all other dimensions of the element 10, 110 may remain the same and there may be a greater, lesser or the same number of membrane leaves 12, 112 may be included, provided that the element does not exceed any dimensional constraints of a given pressure vessel 32. For example, in filtration applications that are very prone to plugging of the feed spacer channels, a thick 35 mils (approximately $8.89 \times 10^{-2}$ cm) thick feed spacer and less membrane leaves 12, 112 may be preferred. As an alternative example, in filtration applications that are less prone to plugging, but plugging remains an operational limitation, a 32 mils (approximately $8.13 \times 10^{-2}$ cm) thick feed spacer may be used with a typical number of, or possibly more, membrane leaves 12, 112 may be preferred.

In another option, the second permeate carrier 120 may be bonded on to the backing surface 162 in a position such that the side edges of the second permeate carrier 120 are distanced from the side edges of the membrane sheet 118 to define the border region 164 on both sides of the membrane leaf 112.

EXAMPLES

The inventors prepared three different three spiral wound membrane elements 200, 202 and 204. Table 1 summarizes the components and their approximate dimensions, used to prepare the spiral wound membrane elements 200, 202, 204. As described above, the width measurement reflects the size of the edge that runs parallel to the central tube. The length measurement reflects the size of the side edges that run perpendicular to the central tube.

TABLE 1

Summary of components in spiral wound membrane elements 200, 202 and 204.

| | Spiral Wound Membrane Element 200 | Spiral Wound Membrane Element 202 | Spiral Wound Membrane Element 204 |
|---|---|---|---|
| Feed Spacer length | 40 +/− 1 inches (101.6 cm*) | 36 +/− 1 inches (91.4 cm) | 36 +/− 1 inches (91.4 cm) |
| Feed Spacer Thickness | 31 mils ($7.87 \times 10^{-2}$ cm) | 31 mils ($7.87 \times 10^{-2}$ cm) | 31 mils ($7.87 \times 10^{-2}$ cm) |
| Number of leaves | 20 | 23 | 23 |
| Membrane Length** | 81 +/− 2 inches (203.8 cm) | 78 +/− 2 inches (198.6 cm) | 78 +/− 2 inches (198.6 cm) |
| Membrane sheet width | 40 inches (101.6 cm) | 40 inches (101.6 cm) | 40 inches (101.6 cm) |
| Membrane sheet thickness | 5.3 mils ($1.34 \times 10^{-2}$ cm) | 5.3 mils ($1.34 \times 10^{-2}$ cm) | 5.3 mils ($1.34 \times 10^{-2}$ cm) |
| Permeate carrier sheet length | 41 +/− 0.25 inches (104 cm) | 39.5 +/− 0.25 inches (100.3 cm) | 39.5 +/− 0.25 inches (100.3 cm) |
| Permeate carrier sheet width placed centered on membrane | 40 +/− 0.25 inches (101.6 cm) | 36 +/− 0.25 inches (91.4 cm) | 34/− 0.25 inches (86.4 cm) |
| Permeate carrier sheet thickness | 10 mils ($2.54 \times 10^{-2}$ cm) | 10 mils ($2.54 \times 10^{-2}$ cm) | 10 mils ($2.54 \times 10^{-2}$ cm) |
| Base permeate carrier length | 56 +/− 1 inches (142.2 cm) | 54.5 +/− 1 inches (138.4 cm) | 54.5 +/− 1 inches (138.4 cm) |
| Base permeate carrier width | 40 inches (101.6 cm) | 40 inches (101.6 cm) | 40 inches (101.6 cm) |

*all measurements in cm are approximates.
**the membrane sheet was folded in half with the feed spacer sheet placed between the folds.

Similar conditions were used for producing the membrane sheets used in all three wound membrane elements 200, 202 and 204. The materials of the permeate carrier sheet used in the spiral wound membrane element 200 was different from the permeate carrier sheet used in the spiral wound membrane elements 202 and 204. The difference in the materials used may have improved the actual permeate flow measurements by approximately 2% over the materials used in the spiral wound membrane element 200.

Each of the spiral wound membrane elements 200, 202 and 204 was made with a sealed distal edge, as described above, and a line of adhesive that was applied approximately one inch (2.54 cm) from the side edges of each membrane sheet, the elements were then rolled about a central tube with a 38.1 mm outer diameter and the adhesive was allowed to cure. The ends of the spiral wound membrane elements 200, 202, 204 were secured with an anti-telescoping device (ATD) and each spiral wound membrane element 200, 202, 204 was then wrapped in a fiber glass outer wrap.

Figure 7:
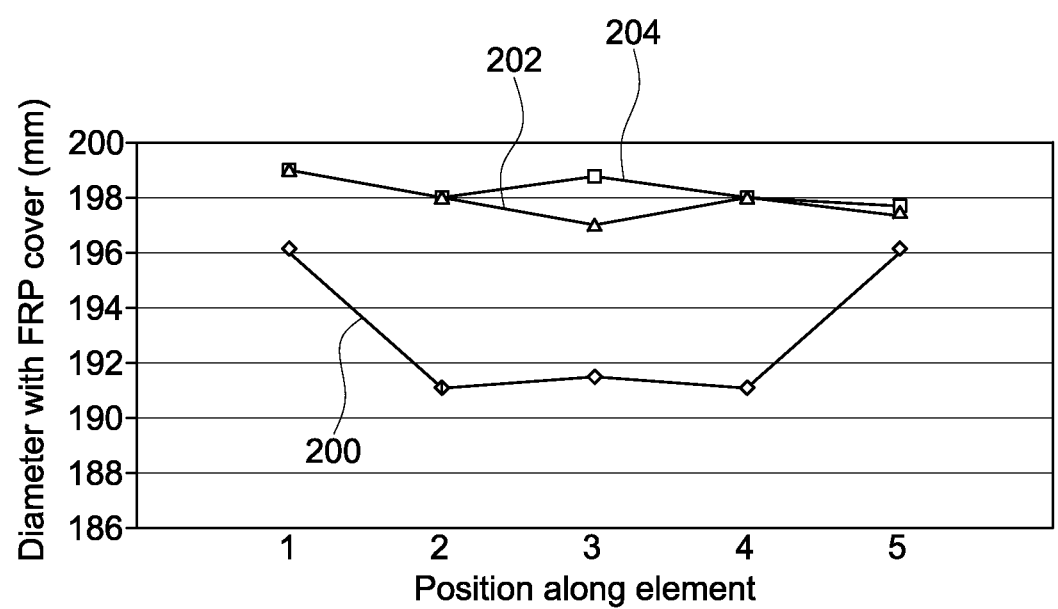
FIG. 7 is a line graph representing the measured outer diameter of three example spiral wound membrane elements.

FIG. 7 depicts the measured outer diameters of the spiral wound membrane elements 200, 202, 204 taken at five positions along their respective lengths. Positions 1 and 5 were at the opposite ends. Position 3 was the center point and position 2 was the center point between positions 1 and 3 and position 4 was the center point between positions 3 and 5. The outer diameter measurements of the spiral wound membrane element 200 demonstrated the expected larger outer diameter at the ends compared to the middle as observed in typical spiral wound membrane elements. The outer diameter measurements of the spiral wound membrane elements 202, 204 did not demonstrate this expected difference. When compared to spiral wound membrane element 200, the spiral wound membrane elements 202, 204 had a larger outer diameter at all positions measured. This larger diameter is likely due to the increased number of membrane leaves within spiral wound membrane elements 202 and 204. The cross-sectional area at the ends of the spiral wound membrane elements 200, 202 and 204 were examined and the distance between concentric layers of permeate carrier sheets was measured to be 6 mm in spiral wound membrane element 200 and 5.2 mm in spiral wound membrane elements 202 and 204.

The inventors tested the integrity of the sealed edges of the membrane leaves within the spiral wound membrane elements 200, 202, 204 with a standard vacuum test. The vacuum test indicated that spiral wound membrane elements 200 and 202 had suitable seals. As will be discussed further below the spiral wound membrane element 204 did not have suitably sealed membrane leaves.

Table 2 below, provides a summary of the calculated active membrane sheet area and the calculated element flow. The calculated active area of the membrane sheets is defined as the area of the membrane sheet that would be exposed to the feed stock between the lines of adhesive.

TABLE 2

A comparison of the calculated active membrane area and flow characteristics of the three spiral wound membrane elements.

| Element | Calculated Active Membrane Area | Calculated Element Flow (litres per minute, LPM) |
| --- | --- | --- |
| 200 | 334 ft² (approximately 31.0 m²) | 36,139 |
| 202 | 381 ft² (approximately 35.4 m²) | 41,393 |
| 204 | 376 ft² (approximately 34.9 m²) | ** |

**no element flow was calculated for the 204 element

The inventors tested the actual function of the spiral wound membrane elements 200 and 202 in pressure vessels with a feed stock with a total dissolved solid content of 3931 PPM at a pressure of 225 psi and a temperature of 25° C. The actual flow of the spiral wound membrane elements 200 was 33,962 LPM and the spiral wound membrane element 202 was 27.2% higher at 43,191 LPM.

The spiral wound membrane elements 200, 202 and 204 were dissected for a qualitative assessment of the membrane leaves. Two membrane leaves of the spiral wound membrane element 200 were examined and these two leaves had straight adhesive lines.

One membrane leaf of spiral wound membrane element 202 was examined and the adhesive lines appeared uniform in thickness and width, and the edges of the permeate carrier sheet were contacted by the adhesive. There was some evidence of the separation layer delaminating from the backing side at the fold of the membrane sheet in spiral wound membrane element 202. The observed defects were not significant enough to greatly impact the function of the spiral wound membrane element 202 and may be supported with the application of tape or foil at the fold of the membrane sheet.

Two membrane leaves of spiral wound membrane element 204 were examined and there was some discoloration of the leaves, possibly due to residual oxidation products. The adhesive lines were of uneven thickness with a wavy vertical appearance and there appeared to be uneven spreading of the adhesive. The edges of the permeate carrier sheet were not covered by the adhesive at the edges and there was evidence of channeling along the side edges where the adhesive did not spread far enough to contact and penetrate into the side edges of the permeate carrier sheet. If the adhesive did spread to contact and penetrate into the permeate carrier the channeling may have been avoided. There was good adhesion of the two membrane sheets within each membrane leaf examined.

In a further example, the inventors constructed another spiral wound membrane element using the second permeate carrier 120 that was approximately 9 mils (approximately $2.28 \times 10^{-2}$ cm) thick and a membrane sheet 118 that was approximately 5 mils (approximately $1.27 \times 10^{-2}$ cm) thick. The total thickness of the second permeate carrier 120 and the adhesive at the side edge was approximately 15 mils (approximately $3.81 \times 10^{-2}$ cm). In contrast, the thickness of the second permeate carrier 120 and the adhesive at the distal edge was approximately 18 mils (approximately $4.57 \times 10^{-2}$ cm). The observed difference between the thickness at the side edge and the distal edge may be due to more of the adhesive spreading through the border region 164 and penetrating into the side edge of the second permeate carrier 120 as compared to the distal edge where more adhesive may have remained at the interface between the second permeate carrier 120 and the membrane sheet 118. The inventors have observed that during manual construction of spiral wound membrane elements, the distal edge may receive a greater quantity of glue as compared to the other sealed edges. This discrepancy in the amount of glue applied may accentuate the thickness of the distal edge in comparison to the side edges. Further, the distance between the side edges of the second permeate carrier 120 and the associated side edges of the membrane sheet 118 may alter the geometry of the spiral wound membrane element 110. The altered geometry may provide a larger space at the distal edge and allow for pooling or collection of glue, which may contribute to a thicker distal edge in comparison to the side edges.

Optionally, the permeate carriers 20 and 120 may be used in membrane leaves in other types of membrane elements, for example, flat membrane elements. In flat membrane elements, membrane leaves may be stacked upon, or beside, each other to form membrane elements with a rectangular cross-section. The rectangular cross-sectional membrane elements may be housed in a pressure vessel, or other type of housing, with a rectangular or circular internal cross-section and the membrane elements are in fluid communication with a permeate and waste collection system. For example, the membrane leaves may be in fluid communication with permeate collection tubes, pipes, conduits or other collectors to collect and conduct the permeate as wanted. The number of membrane leaves that typically fit in such pressure vessels may also be limited by the thickness of the side edges of the membrane leaves that are sealed with adhesive. The active surface area of these membrane elements may be increased by using a permeate carrier 20, 120 that contributes, or not at all, to the thickness at the edges. This may permit the packing of more membrane leaves 112, vertically, horizontally or otherwise, within the physical dimensions of a given housing.

This written description uses examples to disclose embodiments of the invention and also to enable any person skilled in the art to practice embodiments of the invention, including making and using any devices or systems and performing any incorporated methods. The patentable scope of embodiments of the invention is defined by the claims, and may include other examples that occur to those skilled in the art.

The invention claimed is:

1. A method of making a membrane leaf for a spiral wound membrane module comprising the steps of,
   a) placing a permeate carrier between two membrane sheets, the permeate carrier comprising a central portion and one or more borders along one or both side edges of the central portion, wherein the permeate carrier has a front side and a back side and the one or more borders are thinner than the central portion;
   b) applying an adhesive to the borders on the front side of the permeate carrier; and,
   c) compressing the membrane sheets together;
   wherein the adhesive is applied to the border only outside of one or more transitions between the one or more borders and the central portion of the permeate carrier.

2. The method of claim 1 wherein the step of compressing the membrane sheets together comprises winding the membrane sheets and permeate carrier around a central tube.

3. The method of claim 1 wherein the permeate carrier comprises a woven sheet.

4. The method of claim 1 wherein the permeate carrier comprises a tricot fabric and wherein the front side of the permeate carrier is the wale side of the tricot fabric.

5. The method of claim 4 wherein the one or more borders are formed by one or more of a) knitting the tricot fabric with thinner yarn in the machine direction in the one or more borders relative to the yarn in the central portion, b) knitting the tricot fabric without wales in the one or more borders, c) knitting the tricot fabric with more deformable yarn in the one or more borders relative to the yarn in the central portion and applying pressure to the one or more borders, and d) knitting the tricot fabric with fewer wales per inch in the one or more borders relative to the central portion and applying pressure to the one or more borders.

6. A method of making a membrane leaf for a spiral wound membrane module comprising the steps of,
   a) placing a permeate carrier between two membrane sheets, the permeate carrier comprising a central portion and one or more borders along one or both side edges of the central portion, wherein the permeate carrier has a front side and a back side and the one or more borders are thinner than the central portion;
   b) applying an adhesive to the borders on the front side of the permeate carrier; and,
   c) compressing the membrane sheets together;
   wherein the permeate carrier comprises a tricot fabric and wherein the front side of the permeate carrier is the wale side of the tricot fabric; and
   wherein the one or more borders are formed by applying pressure to the tricot fabric.

7. A method of making a membrane leaf for a spiral wound membrane module comprising the steps of,
   a) placing a permeate carrier between two membrane sheets, the permeate carrier comprising a central portion and one or more borders along one or both side edges of the central portion, wherein the permeate carrier has a front side and a back side and the one or more borders are thinner than the central portion;
   b) applying an adhesive to the borders on the front side of the permeate carrier; and,
   c) compressing the membrane sheets together;
   wherein the one or more borders are 2-5 mil thinner than the central portion.

* * * * *